(12) United States Patent
Fritz et al.

(10) Patent No.: US 7,324,226 B2
(45) Date of Patent: Jan. 29, 2008

(54) METHOD, AND ARRANGEMENT IN A COMMUNICATIONS NETWORK

(75) Inventors: Örjan Fritz, Hagersten (SE); Peter Pelden, Vallentuna (SE); Anders Oberg, Vallentuna (SE); Henrik Eriksson, Uppsala (SE)

(73) Assignee: National Semiconductor Corporation, Santa Clara, CA (US)

( * ) Notice: Subject to any disclaimer, the term of this patent is extended or adjusted under 35 U.S.C. 154(b) by 954 days.

(21) Appl. No.: 09/867,429

(22) Filed: May 31, 2001

(65) Prior Publication Data

US 2002/0051184 A1 May 2, 2002

Related U.S. Application Data

(60) Provisional application No. 60/208,098, filed on May 31, 2000.

(51) Int. Cl.
 *G06F 15/00* (2006.01)
 *G06F 3/12* (2006.01)
 *G06F 15/16* (2006.01)

(52) U.S. Cl. .................. 358/1.15; 358/1.1; 709/203

(58) Field of Classification Search .............. 358/1.13, 358/1.15, 442, 1.1; 709/201, 203, 229, 227, 709/228, 230, 231; 455/3.01, 462.2, 151.2; 380/270; 381/311; 235/426.46, 472.02; 340/5.61, 5.64, 825.72; 370/913; 345/2.3
See application file for complete search history.

(56) References Cited

U.S. PATENT DOCUMENTS

| | | | |
|---|---|---|---|
| 5,129,639 A * | 7/1992 | DeHority ................ 270/1.01 |
| 5,682,379 A * | 10/1997 | Mahany et al. .......... 370/311 |
| 6,055,062 A | 4/2000 | Dina et al. |
| 6,163,538 A * | 12/2000 | Brown et al. ............. 370/389 |
| 6,379,058 B1 * | 4/2002 | Petteruti et al. ........... 400/76 |
| 6,601,093 B1 * | 7/2003 | Peters ................... 709/220 |
| 6,704,293 B1 * | 3/2004 | Larsson et al. ........... 370/255 |
| 6,751,200 B1 * | 6/2004 | Larsson et al. ........... 370/255 |
| 6,792,247 B2 * | 9/2004 | Law et al. ............... 455/41.2 |
| 6,901,057 B2 * | 5/2005 | Rune et al. .............. 370/310 |
| 6,922,548 B1 * | 7/2005 | Moore et al. ............ 455/41.2 |
| 6,980,319 B2 * | 12/2005 | Ohta ..................... 358/1.18 |
| 7,088,687 B2 * | 8/2006 | Ayyagari et al. .......... 370/278 |
| 7,218,406 B2 * | 5/2007 | Al-Kazily et al. ........ 358/1.15 |
| 7,231,451 B2 * | 6/2007 | Law et al. ............... 709/230 |
| 7,242,497 B2 * | 7/2007 | Uchiyama et al. ....... 358/1.15 |

(Continued)

FOREIGN PATENT DOCUMENTS

EP 1 001 348 5/2000

(Continued)

OTHER PUBLICATIONS

Riku Mettala, "Bluetooth Protocol Architecture," Version☐☐AO 1.0, Aug. 25, 1999, pp. 1-20.*

(Continued)

*Primary Examiner*—Madeleine A V Nguyen

(57) ABSTRACT

A method and an arrangement in a data communications system. The object of the invention is to achieve a wireless communication between a processing unit and a printer using a safe transmission and an increased transmission range compared to the infrared transmission. The solution is a way of printing a document in a data communications system using a protocol profiled for printing in the Bluetooth protocol architecture.

71 Claims, 13 Drawing Sheets

U.S. PATENT DOCUMENTS

2001/0003191 A1* 6/2001 Kovacs et al. .............. 709/226

FOREIGN PATENT DOCUMENTS

| EP | 1 003 307 | 5/2000 |
|----|-----------|--------|
| WO | 99/41876  | 8/1999 |
| WO | 00/21203  | 4/2000 |

OTHER PUBLICATIONS

Microsoft Press Computer Dictionary, Microsoft Press, Microsoft Corporation, 3rd edition, 1997.*

Debry, R., et al.; "Internet Printing Protocol/1.0; Model and Semantics"; RFC 2566; Network Working Group; RFC Index (2501.2600); Apr. 1999; pp. 1, 50, 51, 110 and 111.

* cited by examiner

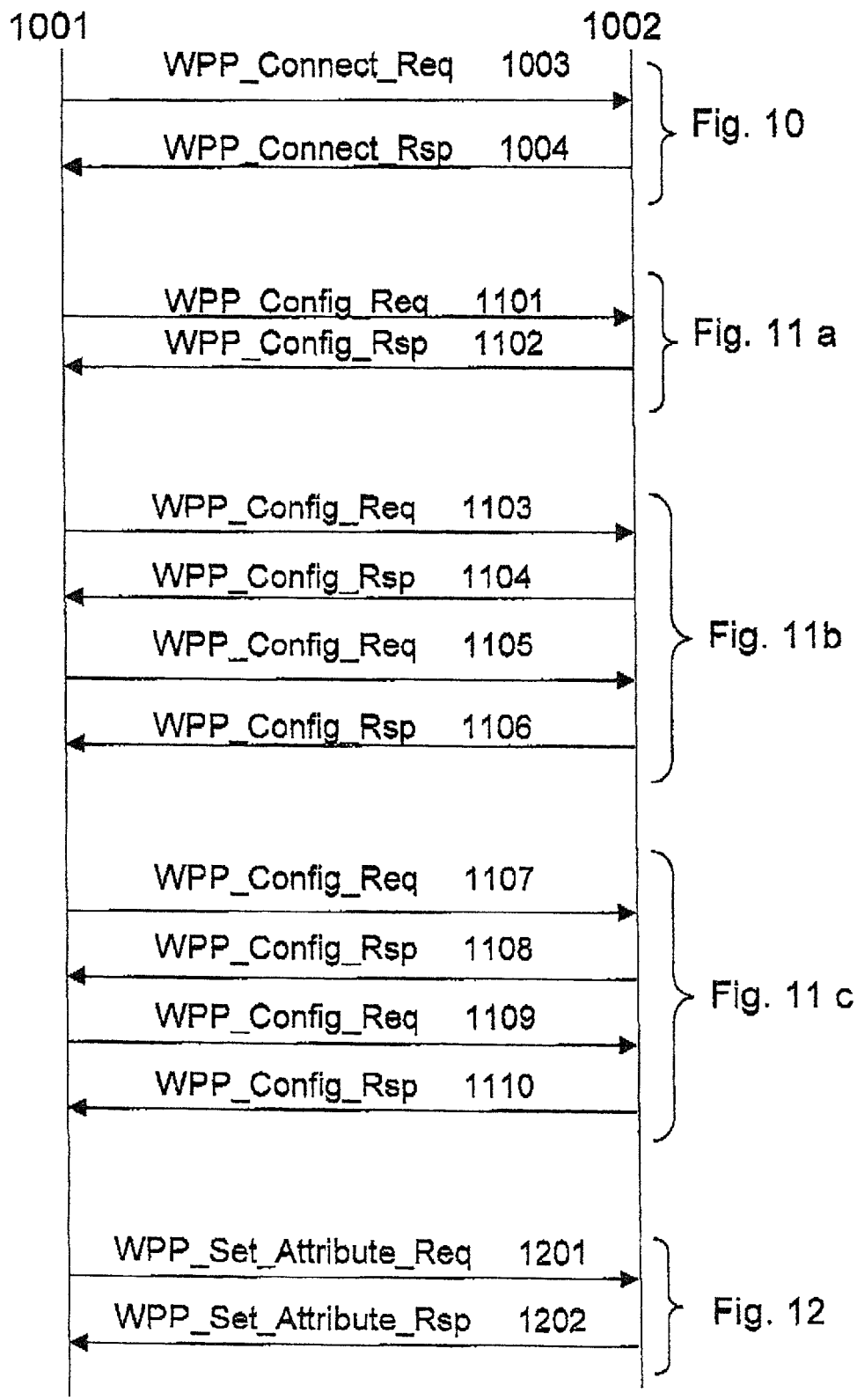

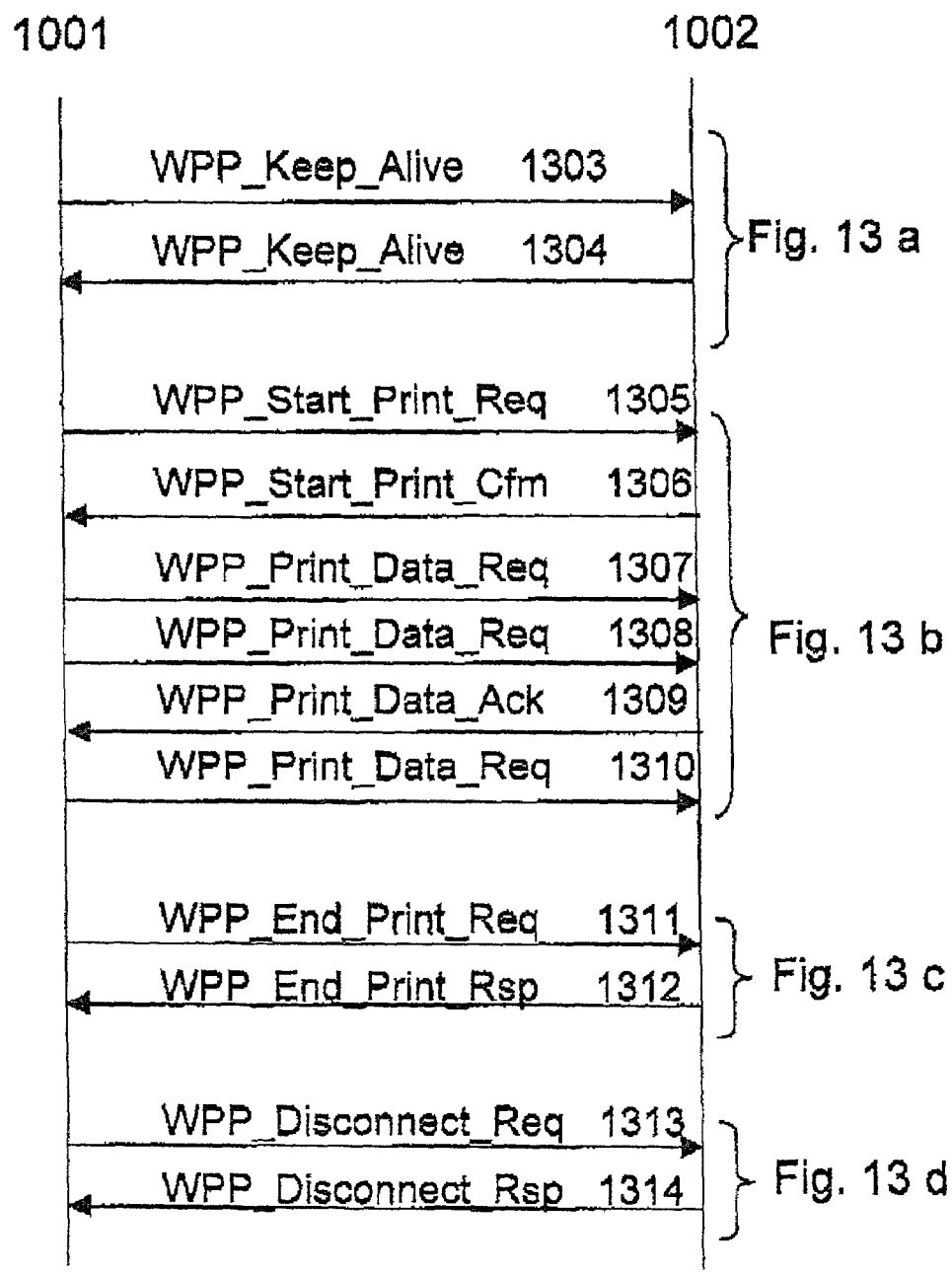

METHOD, AND ARRANGEMENT IN A COMMUNICATIONS NETWORK

This application claims the benefit of U.S. provisional application No. 60/208,098, filed May 31, 2000.

FIELD OF INVENTION

The present invention relates to a method and an arrangement in a data communications system according to the preambles of the independent claims. More specifically it relates to a processing unit wirelessly connected to a printer. It further relates to printing a document by means of the printer, the printer being controlled by the processing unit.

DESCRIPTION OF RELATED ART

Processing units, e.g. PC's requiring to print documents uses typically a printer. A processing unit and a printer are generally communicating with each other through cables. But communication disruption caused by wire breakage or inadequate securing of the cable ends, added cost of providing a reliable cable and reliable associated connectors, tangling of the cables and requirements of flexibility, etc. leads to a requirement of replacing the cables.

A way of communicating, using a infrared link instead of a cable is shown in the American patent U.S. Pat. No. 6,055,062, which discloses an electronic printer having an attached accessory unit. The accessory unit handles e.g. optional media (e.g. paper) supply units and optional media output. To communicate with the accessory unit, the printer uses a two-ways infrared communications connection to the accessory unit to which it is immediately adjacent.

However the range of the infrared link is short, so that the distance between processing unit and the printer have to be less than a few meters and there must be a clear line of sight between them.

The so-called Bluetooth interface is an example of a modern radio interface, which was originally intended as replacement for cables between units. The term Bluetooth is in this disclosure used as an example of usage of short-range radio communication. By replacing the cables, the short-range radio technology provides a universal bridge to existing data networks, a peripheral interface, and a mechanism to form small private ad hoc groupings of connected devices away from fixed network infrastructures or connected to a fixed network infrastructure via a gateway. Designed to operate in a noisy frequency environment, the Bluetooth radio uses a fast acknowledgement and frequency hopping scheme to make the link robust. Bluetooth radio modules avoid interference from other signals by hopping to a new frequency after transmitting or receiving a data packet, as shown in FIG. 1 wherein the X-axis represents the frequency f and the Y-axis represents the time t. Compared with other systems operating in the same frequency band, the Bluetooth radio typically hops faster and uses shorter radio packets. This makes Bluetooth radio more robust than other systems. Use of Forward Error Correction (FEC) limits the impact of random noise on long-distance links.

Bluetooth radio is a wireless communication technology using a frequency-hopping scheme in the unlicensed Industrial Scientific Medical (ISM) band at 2,4 GHz. A frequency hop transceiver is applied to combat interference and fading. A shaped, binary FM modulation is applied to minimise transceiver complexity. The gross data rate is 1 Mb/s and Time-Division Duplex (TDD) scheme is used for full duplex transmission.

The Bluetooth protocol is a combination of circuit and packet switching. In FIG. 1, S1 denotes one time slot, and P1 denotes a packet covering three time slots. A time slot is 0,625 ms long. Time slots can be reserved for synchronous packets. Each packet is normally transmitted in a different hope frequency. A packet normally covers a single slot, but can be extended to cover up to five slots. Bluetooth can support an asynchronous data channel, up to three simultaneous synchronous voice channels, or a channel with simultaneously supports asynchronous data and synchronous voice. Each voice channel supports 64 kb/s synchronous (voice) link. The asynchronous channel can support an asymmetric link of maximally 721 kb/s in either direction while permitting 57,6 kb/s in the return direction, or a 432,6 kb/s symmetric link.

In FIG. 2, the different function blocks of a system using short-range radio transceivers such as Bluetooth are shown. A radio unit 201 is connected to a link control unit 202 providing the base band. The link control unit 202 is connected to the Central Processing Unit, called CPU, 203 providing the link management. The CPU is connected to the memory 204 providing software functions and consisting of two memory units: a SRAM 205 and a FLASH 206. The CPU 203 is connected to a host interface 207. A SRAM is a fast temporary memory. FLASH is a programmable ROM.

Two or more, up to eight Bluetooth units sharing the same channel form a piconet, i.e. a piconet is a collection of devices connected via Bluetooth technology in an ad hoc fashion. Within a piconet a Bluetooth unit can have either of two roles: master or slave. Within each piconet there may be one and only one master, and up to seven active slaves, i.e. a piconet starts with two connected devices, such as a portable PC and a cellular telephone, and may grow to eight connected devices. All Bluetooth devices are peer units and have identical implementations. Any Bluetooth unit can become master in a piconet. A master unit is the device in a piconet whose clock and hopping sequence are used to synchronise all other devices within the piconet. A slave unit is every device in a piconet that is not a master.

The communication within a piconet is organised such that the master polls each slave according to some polling scheme. Master-to-slave transmission always starts in an even-numbered time-slot while slave-to-master transmission always starts in an odd-numbered time slot. With one exception the slave is only allowed to transmit after have been polled by the master. The slave then starts its transmission in a slave-to-master time slot immediately following the packet received from the master. The master may or may not include data in the packets used to poll the slave. The only exception to the above principle is that when a slave has an established Synchronous Connection Oriented (SCO) link, the slave is always allowed to transmit in the pre-allocated slave-to-master slot, even if not explicitly polled by the master in the preceding master-to slave slot. The term SCO-link will be disclosed in more details below. In a Bluetooth communications system there is no direct transmission between slaves in a piconet.

The Bluetooth protocol stack will be described, according to the specifications of the Bluetooth system. The protocol stack which is depicted in FIG. 3, includes two Bluetooth units 301 and 302. In the figure the physical layer and the data link layer are shown.

Baseband BB

The base band describes the digital signal processing part of the hardware, i.e. the Bluetooth link controller, which carries the Bluetooth protocols and other low-level link routines. The Baseband resides in the physical layer 301 and the data link layer 304. The baseband specification defines two link types: Synchronous Connection-Oriented (SCO) links and Asynchronous Connection-Less (ACL) links. SCO links support real-time voice traffic using reserved bandwidth. ACL links support best effort traffic.

Link Manager Protocol LMP

LMP handles messages used for link set-up, security and control. LMP is layered over the Baseband protocol and resides in the data link layer 304.

Logical Link Control and Adaptation Layer Protocol, L2CAP

L2CAP is also layered over the Baseband protocol and resides in the data link layer 304. L2CAP provides connection oriented and connectionless data services to upper layer protocols with multiplexing capability, segmentation and reassemble operation, and group abstractions. The L2CAP Specification is only defined for ACL links.

Network Layer 305

The network layer is currently not specified in the Bluetooth standard.

High Level Protocol or Application 306

Device information, services and the characteristics of the services can be queried using the Service Discovery Protocol SDP. Like SDP, RFCOMM is layered on top of the L2CAP. RFCOMM is the 'cable replacement' protocol, which provides transport capabilities for high-level services (e.g. OBEX protocol) that use serial line as the transport mechanism.

On top of the link and transport protocols, the applications still need some specific protocols to complete the protocol stack. In the Bluetooth architecture, the application-specific protocols are added on top of RFCOMM or directly on the L2CAP. L2CAP can only be accessed via a protocol which is supported by a Bluetooth profile such as RFCOMM.

The enumerated application-specific protocols offer the basic functionality in the Bluetooth environment and they provide only the cable-replacement capabilities. Features such as broadcasting, point-to-multipoint topologies, and scatternet possibilities are not really utilised by these current high-level protocols and usage models. Thus, there are numerous possibilities for developers to create more applications, the nature of which can be totally different from the existing ones.

The object of the present invention is to achieve a wireless communication between a processing unit and a printer using a safe transmission and an increased transmission range compared to the infrared transmission used in the above mentioned US-patent.

SUMMARY OF THE INVENTION

The object of the invention is to unravel the above mentioned drawbacks and achieve a way of printing a document in a data communications system using a protocol profiled for printing in the Bluetooth protocol architecture.

This is achieved according to the method and arrangement set forth in the characterising parts of the independent claims.

Preferred embodiments are set forth in the independent claims.

An advantage of the method and arrangement according to the present invention is that it is possible to communicate wirelessly with a printer at a wide range, up to 10 meters and extendable up to 100 meters.

Another advantage is that it offers a safe transferring of data.

Yet another advantage is that the present invention makes it possible to wirelessly select a printer among available printers.

BRIEF DESCRIPTION OF THE DRAWINGS

FIG. 10 shows a signalling sequence over typical WPP transactions.

FIG. 11 shows a signalling sequence over typical WPP transactions.

FIG. 12 shows a signalling sequence over typical WPP transactions.

FIG. 13 shows a signalling sequence over typical WPP transactions.

DESCRIPTION OF PREFERRED EMBODIMENTS

Figure 1:
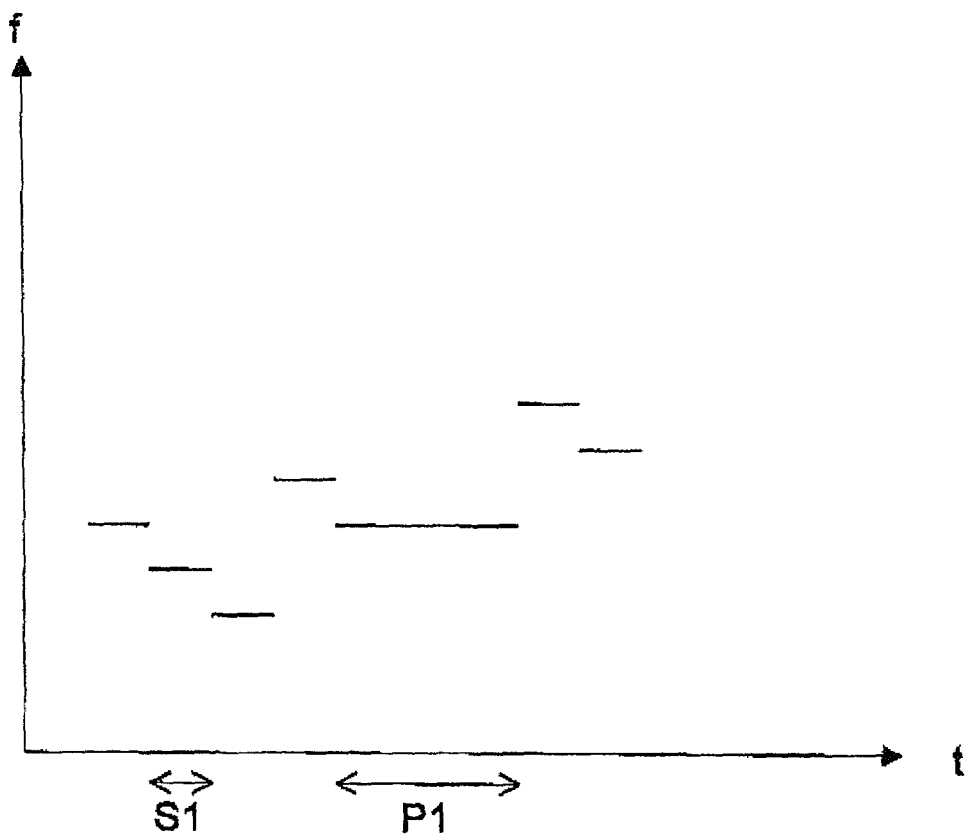
FIG. 1 is a diagram showing the relationship between timeslots and frequency hops in a system using Bluetooth.
Figure 2:
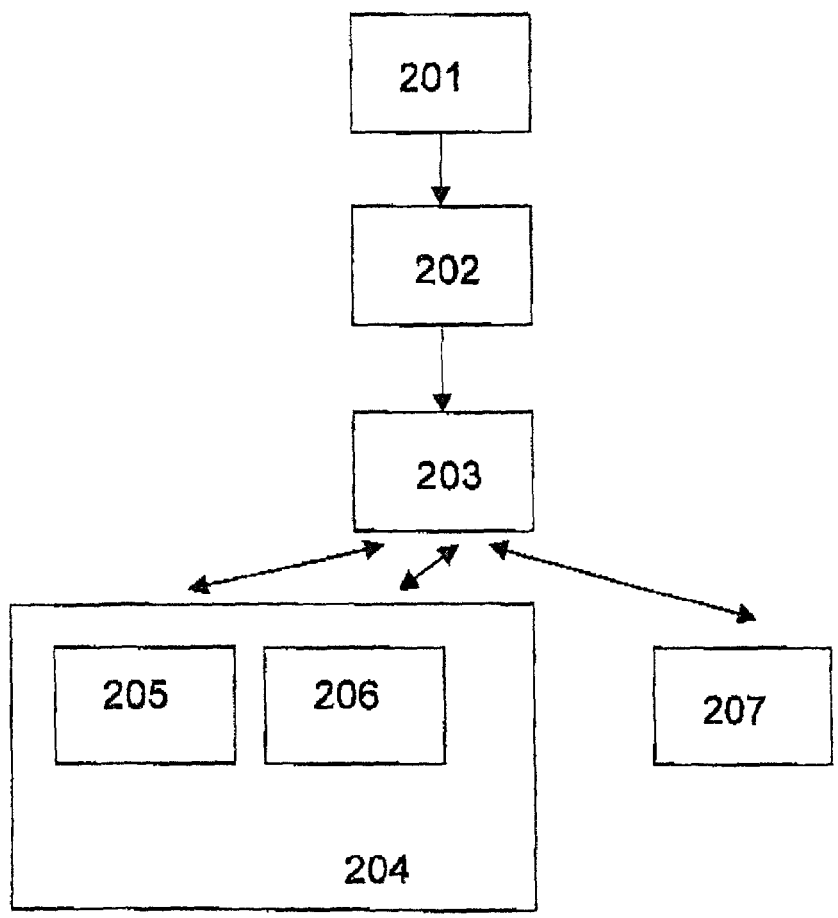
FIG. 2 is a diagram illustrating the different function blocks of a Bluetooth system.
Figure 3:
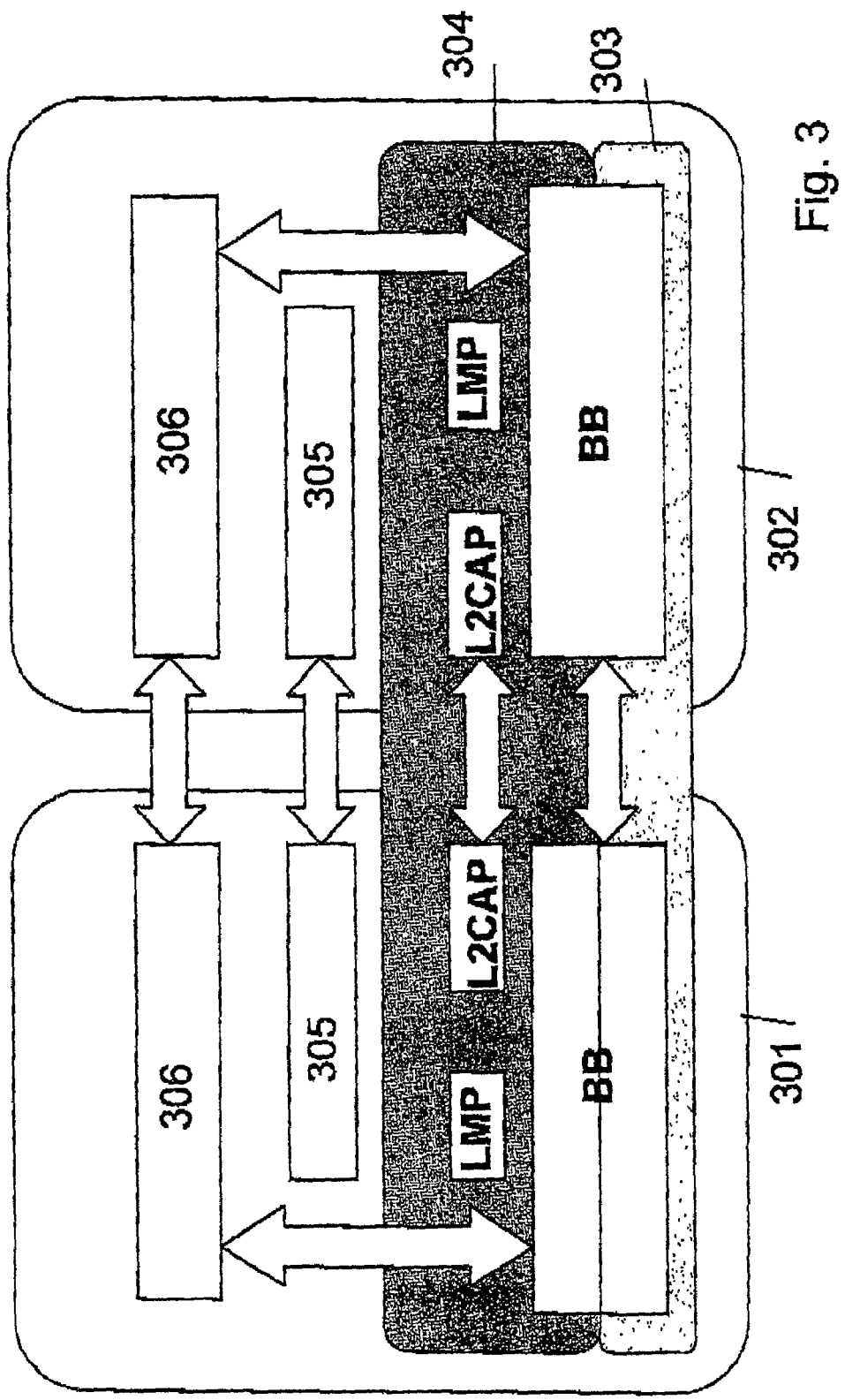
FIG. 3 is a diagram showing the Bluetooth protocol stack.

FIGS. 1-3 are related to prior art and described above under "Description of related art".

The wording "client" is in this disclosure defined as the entity sending a request, and the wording "server", is in this disclosure defined as the entity receiving a request.

Figure 4:
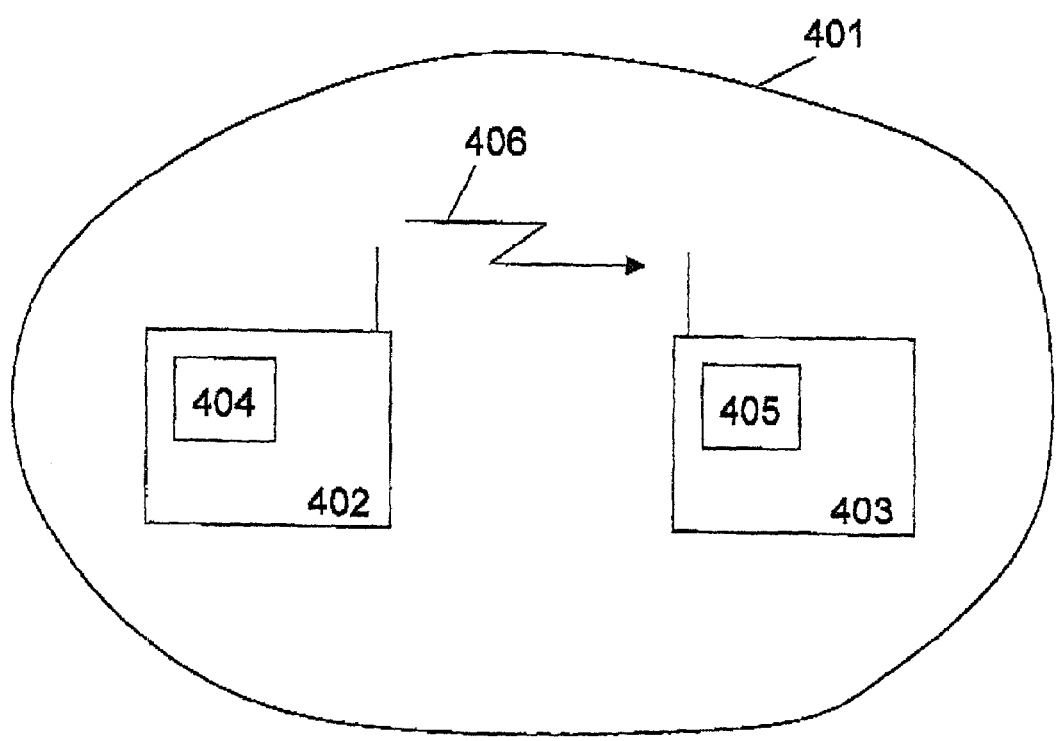
FIG. 4 is a schematic block diagram showing a communications system according to the present invention.

FIG. 4 shows a possible scenario of the present invention. A Bluetooth data communications system 401 includes two nodes whereof one is a processing unit, which in this example is a PC 402 and the other is a printer 403. A wireless printer protocol according to the invention is implemented in the Bluetooth protocol stack which is included in a entity, e.g. a PC-card 404, connected to or implemented in the PC 402, and in a printer entity, e.g. a printer adapter 405, connected to or implemented in the printer 403. According to the Bluetooth standard the distance between the processing unit and the printer is up to 10 meters and extendable up to 100 meters The printer adapter 405 might be connected to the printer port on the printer. The PC 402 and the printer 403 are connected to each other via a Bluetooth air interface 406. Both entities 404 and 405 comprise a respective computer, each computer comprising an internal memory for storing computer program not visible in FIG. 4.

Figure 5:
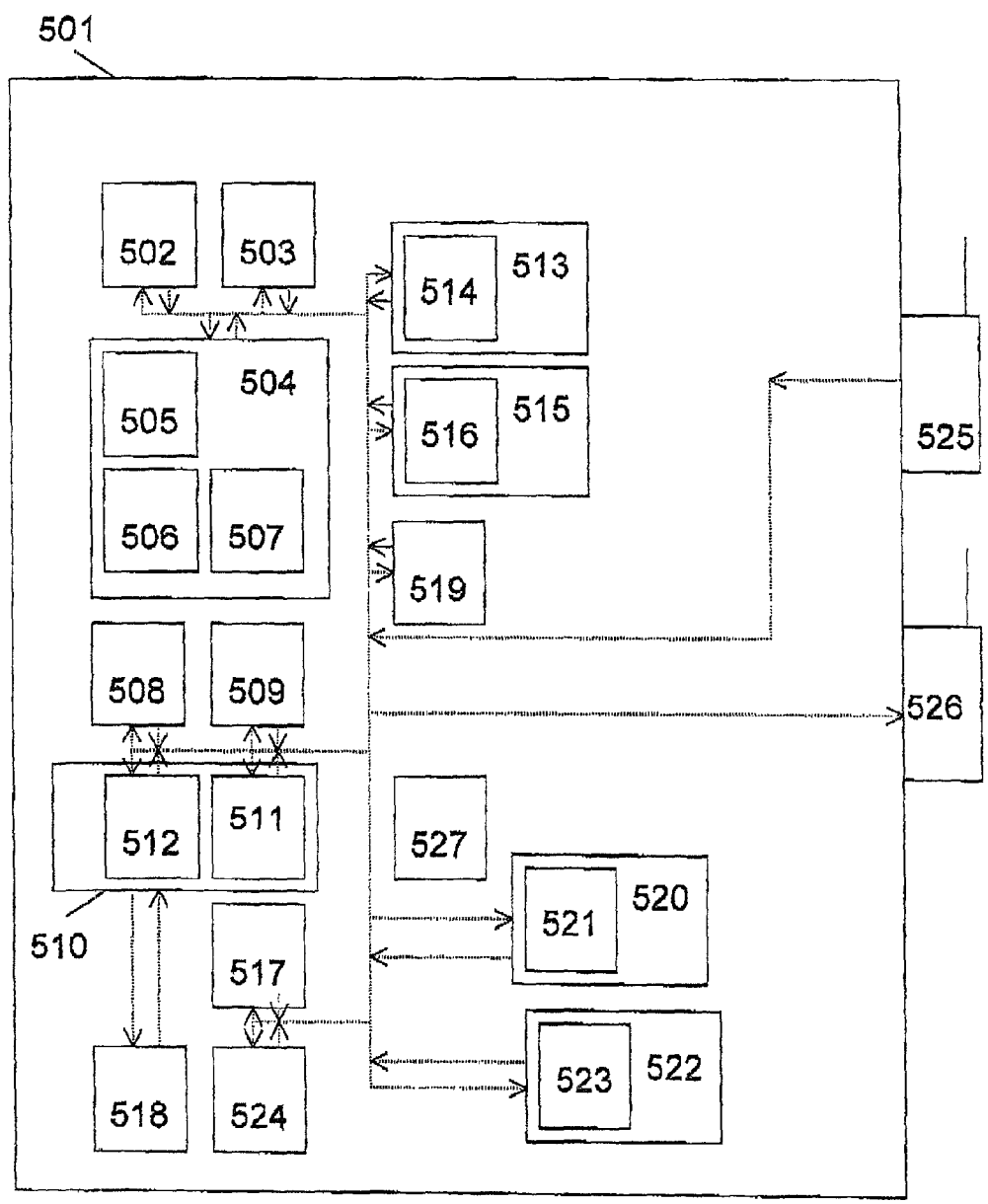
FIG. 5 is a schematic block diagram showing an entity according to the present invention.

The entity 404 connected to or implemented in the processing unit 402, will now be described more in detail. The entity, now referred to as 501 is shown in FIG. 5. The entity 501 includes a Bluetooth protocol stack in which protocol stack a wireless printer protocol is implemented. The printer protocol comprises a printer client which communicates with a printer server by means of the wireless printer protocol, the Bluetooth protocol stack and air interface,. The printer server is included in a printer but is not visible in FIG. 5.

The entity 501 includes an establishing device 502 arranged for establishing a bi-directional wireless ACL connection between the processing unit and the printer by means of the Bluetooth protocol.

The entity 501 comprises further a sending device 503 arranged for sending a connection request message to the printer server and a negotiating device 504 arranged for negotiating configuration parameters with the printer server. The negotiating device 504 comprises a sending device 505 arranged for sending, to the printer server, a configuration request message including no new options if the printer client uses default values. The negotiating device 504 comprises also a sending device 506 arranged for sending, to the printer server, a configuration request message including a suggestion of configuration options. The negotiating device 504 comprises further a sending device 507 arranged for sending, to the printer server, a further configuration request message including a suggestion of configuration options which differs from earlier suggestions of configuration options. This latter sending device 507 is to be used if the printer client receives a response message from the printer server that the configuration request was not acceptable due to e.g. unacceptable parameters, unknown option etc.

The entity 501 comprises a sending device 508 arranged for sending a set attribute request message to the printer server, the message comprising e.g. a coding table concerning a negotiated coding type and is to be loaded by the printer server.

The entity 501 comprises a sending device 509 arranged for sending keep alive messages frequently to the printer server. A keep alive timer 510 is implemented in the entity 501 and comprises a starting device 511 arranged for starting and restarting the keep alive timer 510 each time a valid message is sent to the printer server and each time a valid message is received from the printer server. The keep alive timer 510 further comprises a closing device 512 arranged for closing the connection between to the printer server, when the keep alive timer 510 expires.

For starting one or more printjobs the entity 501 comprises a starting device 513 arranged which starting device 513 comprises a sending device 514 arranged for sending a request message to the printer server comprising a request to start a printjob.

The print data that is to be printed by the printer is sent by means of a sending device 515 arranged for sending the print data to the printer server. Said device 515 includes a sending device 516 arranged for sending a number of request messages to the printer server, the messages comprising print data.

A printing process might be broken, e.g. because the printer runs out of paper or the ACL connection is broken, etc. This is reported by the printer server in a message received by the printer client. The entity 501 comprises a device 527 arranged for interpret the message and give a note to the user of the processing unit, e.g. by presenting the note on the screen of the PC.

E.g. a refill of paper or a new creation of a disconnected ACL connection might make, but the entity 501 comprises a continuing device 517 arranged for continuing the printing process by continuing to send print data request messages to the printer server, starting with the print data subsequent to a last received print data acknowledgement message.

The entity 501 comprises a stopping device 518 arranged for stopping the keep alive timer 510 when an ACL connection is disconnected during a printing process.

The entity 501 further comprises a requesting device 519 arranged for requesting a reconnection of a session defined by the session identifier in a message sent to the printer server to be used when a new ACL connection is created to the printer, after a break.

The entity 501 comprises a stopping device 520 arranged for stopping the print job said stopping device 520 comprises a sending device 521 arranged for sending a message to the printer server, the message comprising a request to stop the printjob. The stopping device 520 will be used when all data to be printed in a printjob is sent to the printer.

The entity 501 further comprises a closing device 522 arranged for closing the connection between the processing unit and the printer, the closing device comprising a sending device 523 arranged for sending a message to the printer server, the message comprising a request to disconnect a session identified by a session identity.

The entity 501 comprises a stopping device 524 arranged for stopping the sending of keep alive messages after closing a connection between the printer client and the printer server.

The entity also comprises a receiver 525 for receiving messages sent from a printer and a transmitter 526 for sending messages to the printer.

Figure 6:
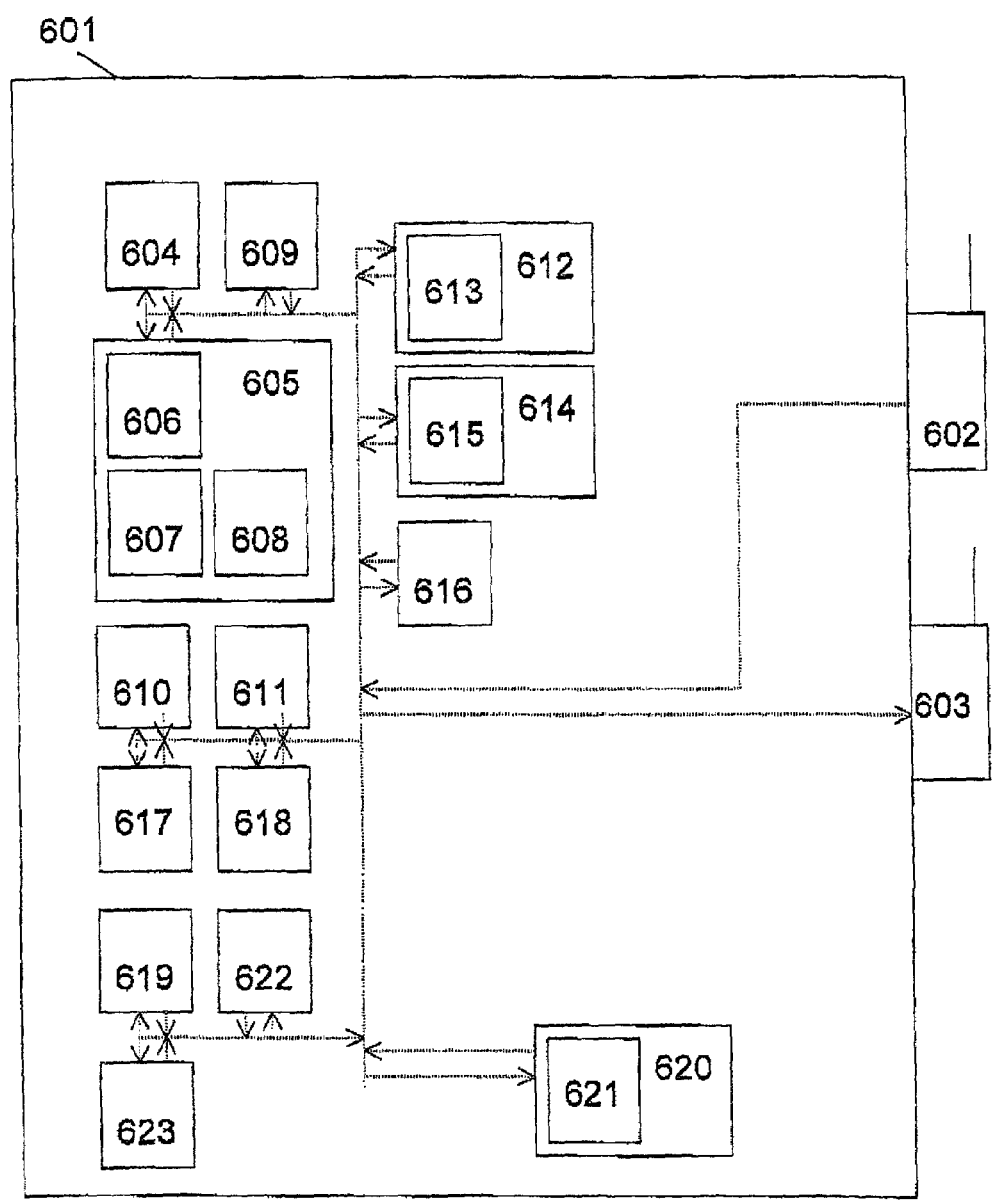
FIG. 6 is a schematic block diagram showing a printer entity according to the present invention.

The printer entity 405 connected to or implemented in the printer 403 shown in FIG. 4, will now be described more in detail. The printer entity, now referred to as 601 is shown in FIG. 6. The printer entity 601, including a Bluetooth protocol stack in which a wireless printer protocol is implemented, said protocol comprising a printer server which communicates, by means of the wireless printer protocol, the Bluetooth protocol stack and air interface, with a printer client, e.g. the printer client in the entity 501 described above. The printer client is included in a processing unit 402 and is not visible in FIG. 6.

The printer entity 601 comprises a receiver 602 for receiving messages sent from a processing unit and a transmitter 603 for sending messages to the processing unit.

The printer entity 601 further comprises a responding device 604 arranged for responding upon a connection request whether the connection is successful or not, in a response message sent to the printer client.

The printer entity 601 comprises a negotiating device 605 arranged for negotiating configuration parameters with the printer client within the processing unit.

The negotiating device 605 comprises a responding device 606 arranged for responding upon a configuration request whether the configuration options in the configuration request are supported by the printer server or not.

The negotiating device 605 comprises a loading device 607 arranged for loading a coding table or other optional attributes sent from the printer client.

The negotiating device 605 further comprises a sending device 608 arranged for sending a response, whether the loading of the coding table was successful or not, to the printer client.

The printer entity 601 comprises a sending device 609 arranged for sending keep alive messages frequently to the printer client.

A keep alive timer 610 is implemented in the printer server within the printer entity 601. The printer entity 601 comprises a starting and restarting device 611 arranged for starting the keep alive timer each time a valid message is received from the printer client and each time a valid message is sent to the printer client.

The printer entity 601 comprises a starting device 612 arranged for starting a print job. The starting device 612 comprises a confirming device 613 arranged for confirming a start printjob request message sent to the printer client The printer entity 601 comprises a receiving device 614 arranged for receiving print data from the printer client. The receiving device 614 including a sending device 615 arranged for sending an acknowledgement message to the printer client after receiving a previous decided number of print data request messages.

The printer entity 601 comprises an indicating device 616 arranged for indicating, in a message sent to the printer client, that the printer has reported an exemption condition, e.g. that the printer is out of paper, if the printer runs out of paper.

The printer entity 601 further comprises an indicating device 617 arranged for indicating, in a message sent to the printer client, when the printer clears the exemption, e.g. that the printer is refilled, when the printer is refilled.

The printer entity 601 comprises a stopping device 618 arranged for stopping the keep alive timer when an ACL connection to the processing unit is disconnected during a printing process.

The printer entity 601 comprises a sending device 619 arranged for sending a response message to the printer client, according to whether a reconnection request is granted or not.

The printer entity 601 comprises a stopping device 620 arranged for stopping the print job.

The stopping device 620 including a sending device 621 arranged for sending a response message, after the printer server has received a request to stop the printjob, the message comprising a confirmation that this is apprehended and is sent to the printer client.

The printer entity 601 comprises a sending device 622 arranged for sending a response message to the printer client, according to whether a disconnection request is granted or not.

The printer entity 601 further comprises a stopping device 623 for stopping the sending of keep alive messages after the connection to the printer client is closed.

Figure 7:
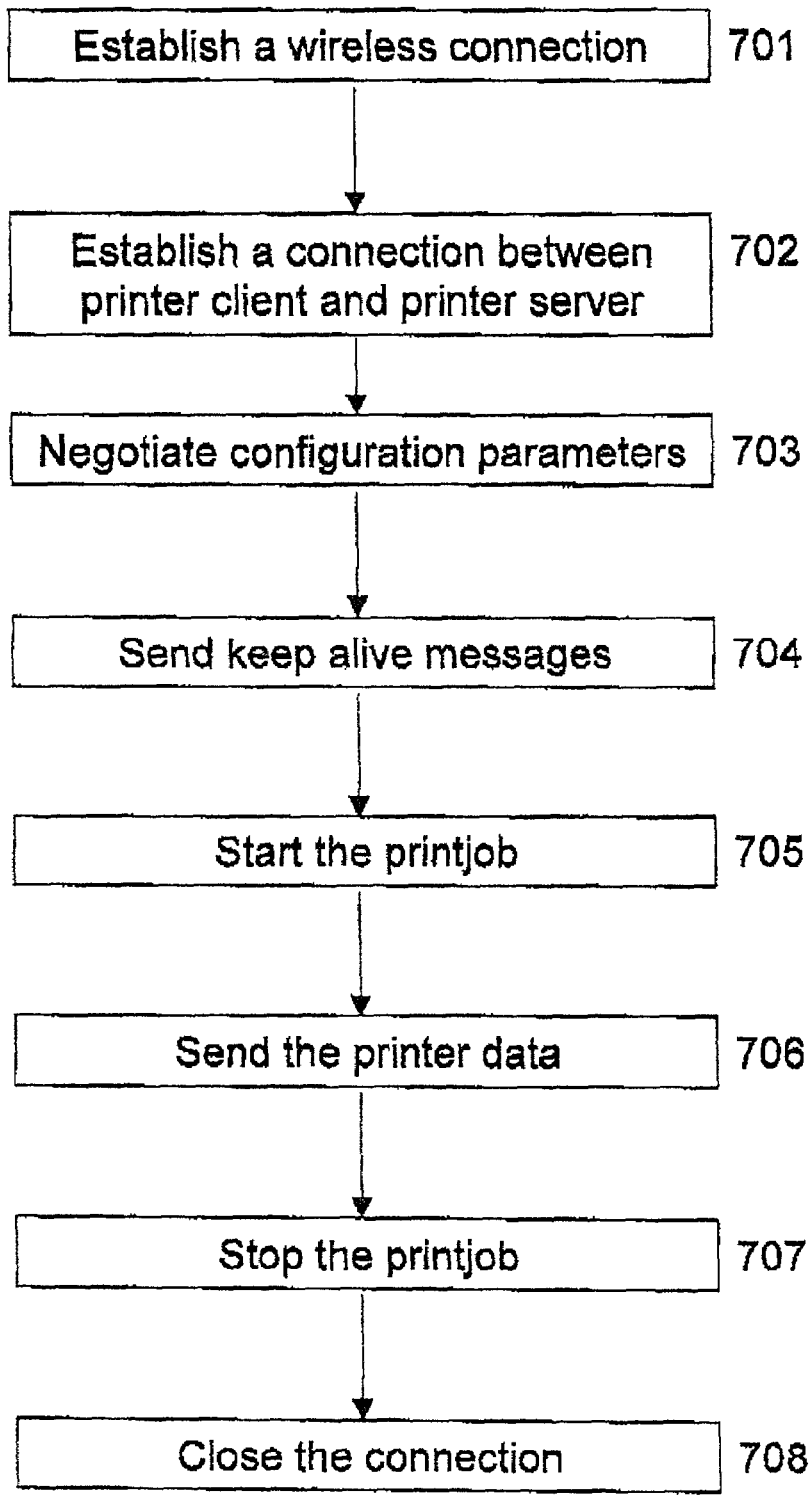
FIG. 7 shows a flowchart of the method according to the invention.

FIG. 7 shows a flowchart of a possible scenario of the printing process according to the present invention.

The method includes the following steps:
701. A bi-directional wireless Asynchronous Connection-Less (ACL) connection is established between the processing unit 402 and the printer 403 by means of the printer protocol calling the L2CAP requesting the connection and the L2CAP creating the connection.
702. A connection is established between the printer client and the printer server for one or more printjobs.
703. The processing unit 402 and the printer 403 negotiate configuration parameters for said connection.
704. Keep alive messages are sent frequently during the session from the processing unit 402 to the printer 403 and from the printer 403 to the processing unit 402.
705. The processing unit 402 starts the printjob and
706. sends the printer data to the printer 403.
707. The print job is stopped and
708. the connection is closed between the processing unit 402 and the printer 403.

The method is implemented by means of a computer program product comprising the software code portions for performing the steps of the method. The computer program product is run on a computer stored in a digital computer within the process unit 402 and within the printer 403, e.g. in the printer adapter 405.

The computer program is loaded directly or from a computer usable medium, such as floppy-disc, CD, Internet etc.

Figure 8:
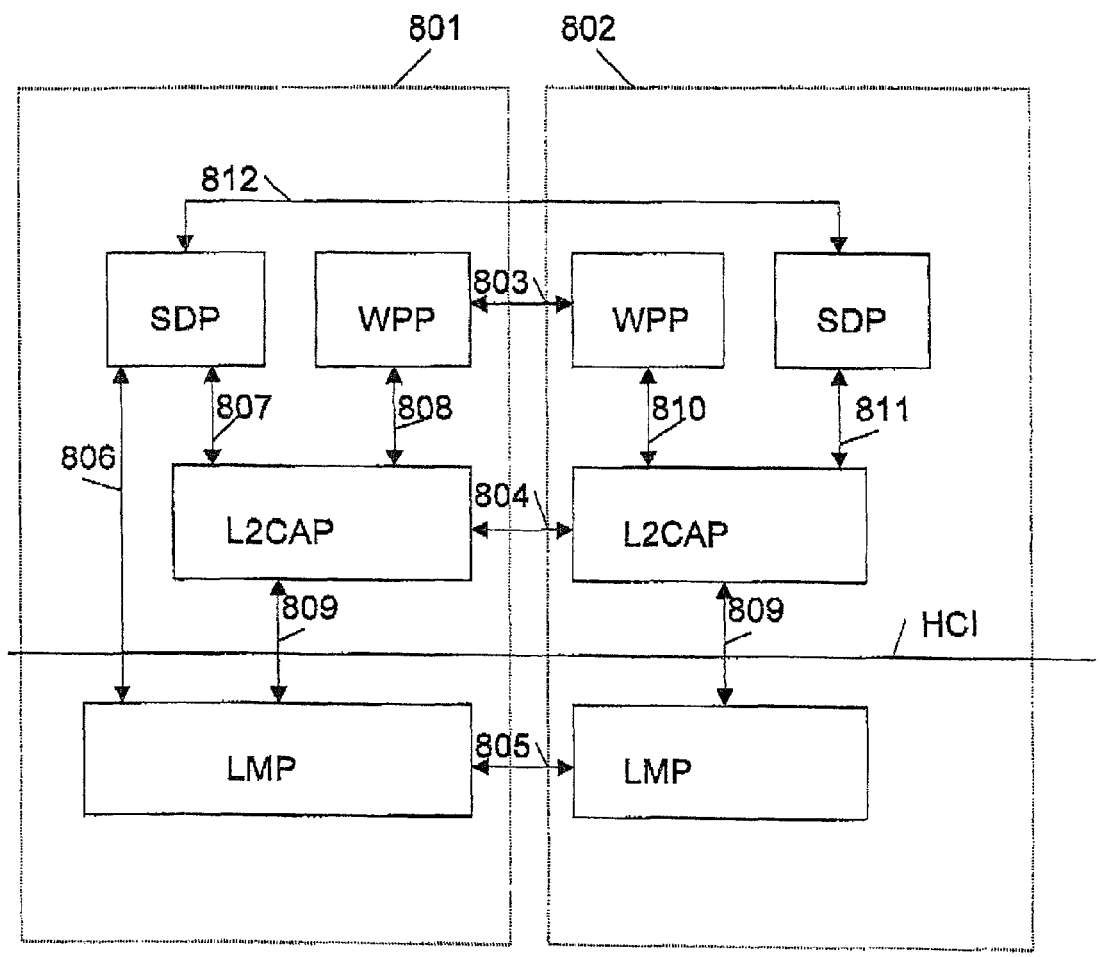
FIG. 8 is a bloc diagram depicting a protocol overview over the Bluetooth protocols according to the invention.

FIG. 8 is a bloc diagram depicting a protocol overview over the Bluetooth protocols including the wireless printer protocol WPP according to the invention. The left side represents the PC 801 and the right side represents the Printer 802. The Host Control Interface HCI is marked as a horizontal line. The HCI provides a command interface to the baseband controller, link manager, and access to hardware status and control registers.

SDP, L2CAP and LMP are described above, under Related Art. WPP will be described more in detail below.

The interface between two entities on the same layer, a so-called horizontal interface, is defined by it's protocol 803, 804, 805 and 812, e.g. L2CAP on PC communicates with L2CAP on printer using the L2CAP protocol.

The actual flow of data (Protocol Data Units, PDU:s) is done between entities in different layers 806, 807, 808, 809, 810 and 811, a so-called vertical interface.

On the PC side the protocols is implemented by following applications:
Client L2CA Application implements L2CAP
Client Printer Application implements WPP
Client Discovery Application implements SDP On the printer side the protocols is implemented by following applications:
Server L2CA Application implements L2CAP.
Server Printer Application implements WPP.
Server Discovery Application implements SDP.

The printing method according to the invention will now be described more in detail.

A processing unit requires to print a document, i.e. to perform a printjob, by means of a printer.

Figure 9:
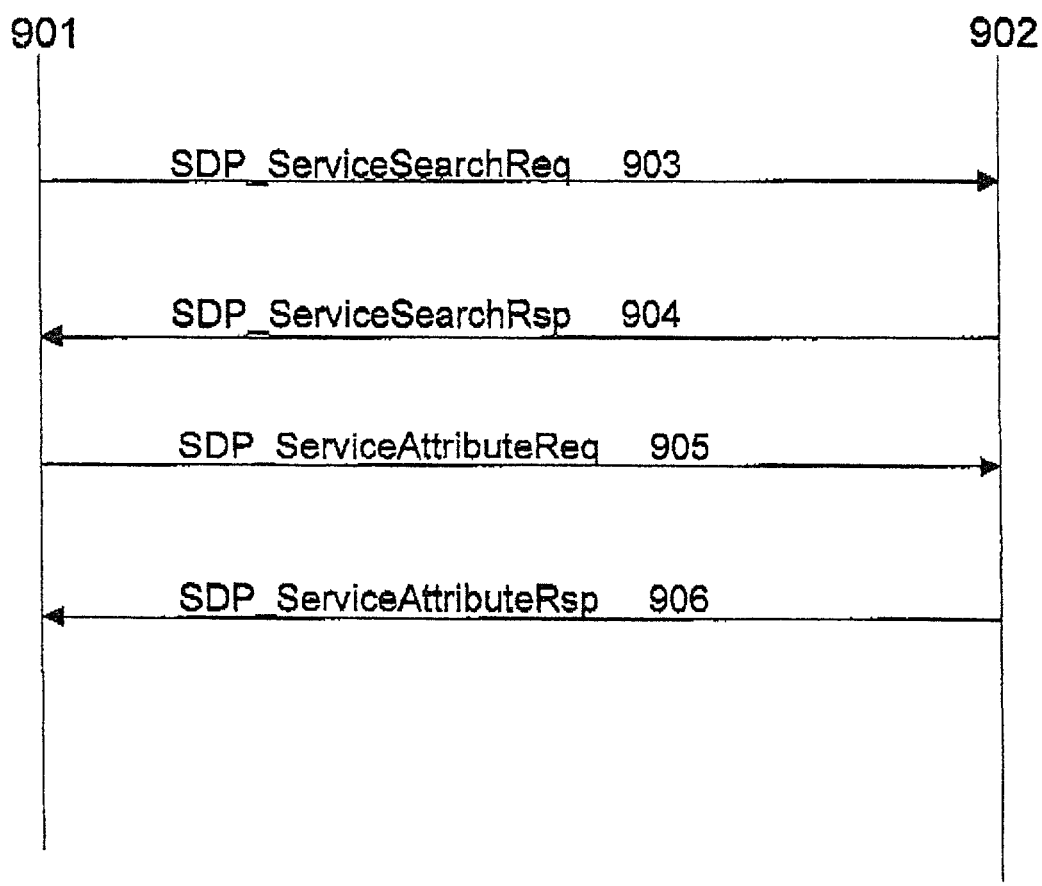
FIG. 9 shows a signalling sequence over a typical SDP transaction.

The processing unit wishes to know which printers that are available, and select one of them, therefore the printing process starts with the Device Discovery procedure, which is a procedure known from the art. FIG. 9 shows a sequence diagram of a typical SDP transaction between the Client Discovery Application 901 and the Server Discovery Application 902. It is assumed that inquire has been performed. As a result of inquire the class of device is retrieved. Class of device indicates the type of device and which type of services the device supports. It is also assumed that a point to point connection with the server has been established, using L2CAP. The PrinterServiceClassId is represented as a Universally Unique Identifier (UUID) and is known by client discovery application.

A message, e.g. a denoted SDP_ServiceSearchReq message 903 is sent, from Client to Server, to ask which services, in this case printers that are available. The server returns service records handles associated with the respective available printers, e.g. in a denoted SDP_ServiceSearchRsp message 904.

The printer service record database serves as a repository of discovery-related information. All of the information about a service that is maintained by an SDP server is contained in a single service record. The service record consists entirely of a list of attributes. A service record handle uniquely identifies each service record within the SDP server, according to Service Discovery Protocol, Bluetooth Specification version 1.0 B concerning SDP and Appendix VIII, Bluetooth Assigned Numbers, Bluetooth Specification version 1.0 B concerning assigned numbers for predefined attributes and their identity.

The Client selects one of the available printers and requests for its attributes, e.g. the address of the printer, a in a message, e.g. a denoted SDP_ServiceAttributeReq message 905 using the service record handle. The attributes are returned in one or more messages, e.g. denoted SDP_ServiceAttributeRsp messages 906.

The Client stores the received attributes and terminate the L2CAP connection

A bi-directional wireless asynchronous connection-less (ACL) connection is established (701) between the processing unit and the printer. This is achieved by means of the printer protocol in the processing unit calling the L2CAP in the within the same unit, requesting the connection to the printer. The printer is connected e.g. by means of the printer address being one of the attributes received. The L2CAP creates the connection and notifies the created connection the printer protocol.

FIG. 10 shows sequence diagrams of a typical WPP transactions concerning the connection operations between the WPP Client 1001 and the WPP Server 1002, according to the invention A creation of a session between a client printer application (source) and a server printer application (destination) is to be requested, i.e. for establishing a connection for one or more printjobs. This is performed by sending a message, e.g. a denoted WPP_Connection_Req message 1003, from the WPP client 1001 to the WPP server 1002. This is shown in FIG. 10. A status indication to the client printer application whether the connection was successful or not and making the session valid if successful is required. This is be performed in a message by the WPP server 1002, e.g. in a denoted WPP_Connection_Rsp message 1004, also shown in FIG. 10. This message also includes a session identity.

The next step of the printing process is the WPP negotiation procedure according to the invention. FIGS. 11 *a-c* and 12 shows sequence diagrams of a typical WPP transactions concerning the negotiation operations between the WPP Client 1001 and the WPP Server 1002, according to the invention.

After creating the session a configuration of the WPP server 1002 is required. Examples of configuration options are e.g. the number of print data request messages to be received by the printer before return a confirmation message, coding type and table size.

FIGS. 11*a*, *b* and *c* shows three different sub-scenarios of a successful negotiation of a coding type for data compression. A message, e.g. a denoted WPP_Configuration_Req message, is sent from the WPP client 1001 to WPP server 1002 to establish an initial logical link transmission contract between the WPP client 1001 and WPP server 1002 and to negotiate configuration parameters, e.g. the coding type. In this example the WPP server 1002 supports the coding types hamming, table size=80 (default) and huffman table size=80. The three respective sub-scenarios may be a continuation of the connection scenario in FIG. 10.

In the first sub-scenario, shown in FIG. 11*a*, the WPP client 1001 uses default values, i.e. hamming, table size=80 and accordingly the WPP_Configuration_Req message 1101 sent, from the WPP client 1001 to the WPP server 1002, includes no new options. Since that is a coding type that the WPP server 1002 supports, it responses success in a message, e.g. a denoted WPP_Configuration_Rsp message 1102.

FIG. 11*b* shows the second sub-scenario in which the WPP client 1001 requests the WPP server 1002, in message, e.g. a denoted WPP_Configuration_Req message, if hamming, table size=100 can be used 1103. This is not a coding type that the WPP server 1002 supports and accordingly it responses in a message, e.g. a denoted WPP_Configuration_Rsp message 1104, failure and suggests that hamming, table size=80 can be used. The WPP client 1001 supports also hamming, table size=80 and responses this to the WPP server 1002 in a message, e.g. a denoted WPP_Configuration_Req message 1105. The WPP server responses success in a message, e.g. a denoted WPP_Configuration_Rsp message 1106.

In the third scenario, shown in FIG. 11*c*, the WPP client 1001 suggests an coding type which is unknown for the printer, i.e. a coding type not supported by the printer, and a size=100, in a message, e.g. a denoted WPP_Configuration_Req message, sent 1107 to the WPP server 1002. Since this coding type is unknown for the WPP server 1002, it responses in a message, e.g. a denoted WPP_Configuration_Rsp message 1108 failure and that the coding type is unknown. The WPP client 1001 then tries another coding type that it supports, in this example huffman, size=80, in a subsequent message, e.g. a denoted WPP_Configuration_Req message 1109 sent to the WPP server 1002. The WPP server 1002 supports huffman, size=80 and accordingly it responses success and confirms huffman, size=80 in a message, e.g. a denoted WPP_Configuration_Rsp message that is sent 1110 to the WPP client 1001.

After the configuration negotiation of coding type according to e.g. the scenarios depicted in FIGS. 11*a-c*, the WPP client 1001 requests to set an attribute which is illustrated in FIG. 12. The WPP client 1001 sends a coding table concerning the negotiated coding type in a message, e.g. a denoted WPP_Set_Attribute_Reg message sent 1201 to the WPP server 1002. The WPP server loads the coding table to be used and confirms whether it was successful or failure in a message, e.g. a denoted WPP_Set Attribute_Rsp message 1202 sent to the WPP client 1001.

The next step of the printing process is the WPP printing procedure. FIGS. 13*a-d*, 14 and 15 shows sequence diagrams of a typical WPP transactions concerning the printing operations, between the WPP client 1001 and the WPP server 1002, according to the invention.

FIGS. 13*a-d* shows a first sub-scenario of a successful printing of one print job. FIG. 13*a* shows the procedure for sending keep alive messages.

When the connection has been established and negotiation has been performed, keep alive messages are to be sent, by the WPP client 1001, 1303 and WPP server 1002, 1304, frequently, e.g. once each 5 second, as an indication that the source is up and running. Such a message is a denoted WPP_Keep_Alive message. If a break occurs when printing, the printer will find out that, since it does not receive any more keep alive messages. The printer then terminates the printjob and can let other users in. A break can also occur on the printer side. There is also occasions when the printer or processing unit are hard loaded, sending keep alive messages just to tell the receiver that it still alive but it goes slowly at the moment. When a connection has been disconnected by WPP client, WPP client 1001 and WPP server 1002 shall stop sending denoted WPP_Keep_Alive messages.

A WPP Keep Alive Timer is restarted each time a valid message is received from the remote endpoint. The timer is implemented on both client and server side. If the Keep Alive timer expires the remote endpoint is considered faulty and the connection is closed and higher level applications is notified. The Keep Alive Timer shall be stopped when a link is disconnected and restarted when a new link is established with the remote endpoint. If a new link is established within a reasonable time, e.g. 10 seconds, the printjob continues where broken. Each WPP message will trigger a restart of a WPP timer.

In FIG. 13b a start of a printjob and sending of data to be printed is shown. The WPP client 1001 requests the WPP server 1002 to start a printjob in a denoted WPP_Start_Print_Req message 1305 s, which in turn confirmed by the WPP server (1002) in a denoted WPP_Start_Print_Cfm message 1306. The WPP client then requests the WPP server 1002 to print data included in a number of denoted WPP_Print_Data_Req messages 1307, 1308. A confirmation is to be sent after the WPP server 1002 has received a number N WPP_Print_Data_Req messages 1307, 1308. The value of N is negotiated during configuration e.g. N=4. The acknowledgement is e.g. sent in a denoted WPP_Print_Data_Ack message 1309. This procedure goes on until all data to be printed is received by the printer server. I.e. until the last WPP_Print_Data_Req message 1310 is received.

When all data to be printed is sent to the printer server the client requests the printer server to stop the printjob. This is shown in FIG. 13c wherein the WPP client 1001 sends a denoted WPP_End_Print_Req message 1311 to the WPP server 1002. That this is apprehended by the printer server is reported e.g. in a denoted WPP_End_Print_Rsp message 1312 sent to the WPP client 1001.

After performing one or more printjobs or if a break of the printjob is requested, the client requests a disconnection of a session defined by the session identifier. Depicted in FIG. 13d, this request is performed by e.g. sending a denoted WPP_Disconnect_Req message 1313 from the WPP client 1001 to the WPP server 1002 and a response, whether the disconnection is granted or not, is sent in the opposite direction in a denoted WPP_Disconnect_Rsp message 1314.

When the session is disconnected the WPP client 1001 and the WPP server 1002 stops sending WPP_Keep_Alive messages.

Figure 14:
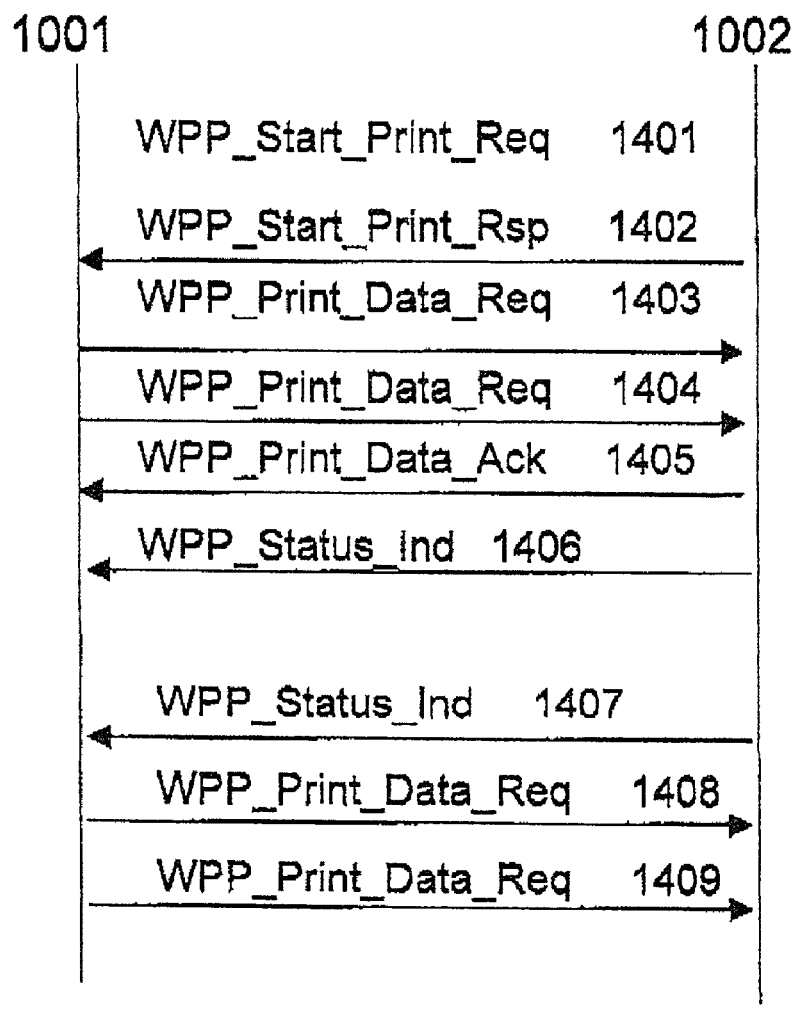
FIG. 14 shows a signalling sequence over typical WPP transactions.

FIG. 14 shows a second sub-scenario of a successful printing of one printjob when the printer is out of paper. Negotiation has been performed, a connection is established and keep alive messages are sent as described above though not visible in FIG. 14. The WPP client 1001 has requested the WPP server 1002 to start the printjob in a message, e.g. a denoted WPP_Start_Print_Req message 1401, which is responded success to in a message, e.g. a denoted WPP_Start_Print_Rsp message 1402. When the WPP client 1001 has requested the WPP server 1002 to print data included in a number of messages, e.g. denoted WPP_Print_Data_Req messages 1403, 1404, being acknowledged by the WPP server 1002 in a message, e.g. a denoted WPP_Print_Data_Ack message 1405, the printer is out of paper. The printer server then has to report this to the client. This can be performed by the WPP server 1002 sending a message, e.g. a denoted WPP_Status_Ind message 1406, indicating that the printer is out of paper to the WPP client 1001. The message is interpreted by the wireless printer protocol and reported to the user of the processing unit, e.g. by presenting a note on the PC screen. The message is obtained by a user of the processing unit including the client, who refills the printer. The printer server then reports that the printer is refilled to the WPP client 1001 by sending a message, e.g. a denoted WPP_Status_Ind message 1407. The last received denoted WPP_Print_Data_Ack message 1405 defines where to continue the printing by sending messages, e.g. denoted WPP_Print_Data_Req messages 1408, 1409 from the WPP client 1001 to the WPP server 1002. The printer will throw data if already printed or if a part of it has been printed. The printing process then continues as described above.

Figure 15:
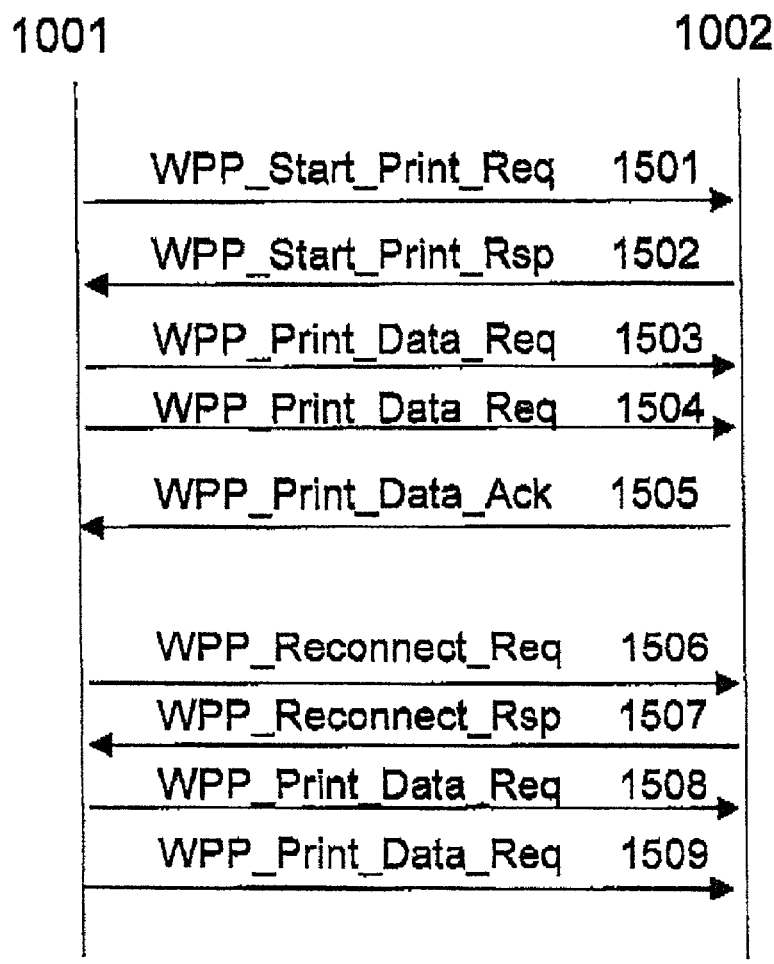
FIG. 15 shows a signalling sequence over typical WPP transactions.

FIG. 15 shows a third sub-scenario of a successful printing of one printjob when the ACL connection is disconnected. Negotiation has been performed, a connection is established and keep alive messages are sent as described above though not visible in FIG. 15. The WPP client 1001 has requested the WPP server 1002 to start the printjob in a message, e.g. a denoted WPP_Start_Print_Req message 1501, which is responded success to in a message, e.g. a denoted WPP_Start_Print_Rsp message 1502. When the WPP client 1001 has requested the WPP server 1002 to print data included in a number of messages, e.g. WPP_Print_Data_Req messages 1503, 1504, the ACL connection is disconnected, indicated by HCI. The Keep Alive Timer is stopped by the WPP client 1001.

A reconnection of the session is required because it is possible for another client to start a printjob during ACL-disconnected. A session identity is used to identify the different WPP entities. If another job is ongoing the server will not accept the reconnection. The time the server will wait for the reconnection has to be handled by a reconnection timer. If the timer times out the ongoing job will be flushed. After creating a new ACL-connection a reconnection of the session is requested. This can be performed by the WPP client 1001 by sending a message, e.g. a denoted WPP_Reconnect_Req message 1506 requesting a reconnection of the session defined by the session identifier. A response according to whether the reconnection is granted or not is sent in a message, e.g. a denoted WPP_Reconnect_Rsp message 1507. In this example it is granted. The WPP Keep Alive timer is started again. The last received denoted WPP_Print_Data_Ack message 1505 defines where to continue the printing by sending messages, e.g. a WPP_Print_Data_Req messages 1507, 1508 from the WPP client 1001 to the WPP server 1002. The printer server will throw data if already printed or if the packet is detected to be a retransmission. The printing process then continues as described above.

The present invention is not limited to the above-described preferred embodiments. Various alternatives, modifications and equivalents may be used. Therefore, the above embodiments should not be taken as limiting the scope of invention, which is defined by the appendant claims.

The invention claimed is:

1. A method for printing a document in a data communications system using a Bluetooth protocol stack including a wireless printer protocol and a Logical Link Control and Adaptation Protocol (L2CAP), the method comprising the steps of:

establishing a bi-directional wireless asynchronous connection-less (ACL) connection between a processing unit including a printer client and a printer including a printer server, wherein establishing the ACL connection comprises the wireless printer protocol calling the L2CAP requesting the ACL connection and the L2CAP creating the ACL connection;

establishing a connection for one or more print jobs between the printer client and the printer server, negotiating configuration parameters between the printer client and the printer server;

sending keep alive messages repeatedly from the printer client to the printer server and from the printer server to the printer client, wherein at least some of the keep alive messages are sent periodically after negotiation of the configuration parameters, wherein the connection between the printer client and the printer server is closed when at least one of: (i) the printer client fails to receive one or more of the keep alive messages from the printer server, (ii) the printer client fails to communicate one or more of the keep alive messages to the printer server, (iii) the printer server fails to receive one or more of the keep alive messages from the printer client, and (iv) the printer server fails to communicate one or more of the keep alive messages from the printer client;

starting a print job;

sending print data from the processing unit to the printer;

stopping the print job; and closing the ACL connection between the processing unit and the printer.

2. The method according to claim 1, further comprising the step of:

selecting the printer from a number of available printers before establishing the ACL connection.

3. The method according to claim 2, wherein the step of selecting the printer comprises using a Device Discovery Protocol.

4. The method according to claim 1, further comprising the step of:

obtaining an address of the printer before establishing the ACL connection.

5. The method according to claim 4, wherein the step of obtaining the address of the printer comprises using a Device Discovery Protocol.

6. The method according to claim 5, wherein establishing the connection for the one or more print jobs comprises sending a connection request message from the printer client to the printer server.

7. The method according to claim 6, wherein establishing the connection for the one or more print jobs further comprises responding to the connection request message in a response message sent from the printer server to the printer client regardless of whether the connection is successful.

8. The method according to claim 1, wherein the step of negotiating the configuration parameters between the printer client and the printer server comprises the printer client requesting configuration in a configuration request message sent to the printer server, the configuration request message including no new options if the printer client uses default values.

9. The method according to claim 1, wherein the step of negotiating the configuration parameters between the printer client and the printer server comprises the printer client requesting configuration in a configuration request message sent to the printer server, the configuration request message including a suggestion of configuration options.

10. The method according to claim 9, wherein said configuration request message is responded to by the printer server in a response message indicating whether the configuration options in the configuration request message are supported by the printer server.

11. The method according to claim 10, further comprising the step of:

sending a further configuration request message from the printer client to the printer server if the configuration options are not supported by the printer server, the further configuration request message including a suggestion of further configuration options which differs from the earlier suggestion.

12. The method according to claim 1, further comprising the step of:

sending a set attribute request message from the printer client to the printer server after negotiating the configuration parameters, the set attribute request message comprising a coding table concerning a negotiated coding type.

13. The method according to claim 12, further comprising the step of:

loading the coding table at the printer server.

14. The method according to claim 13, further comprising the step of:

sending a response to the set attribute request message from the printer server to the printer client regardless of whether the loading was successful.

15. The method according to claim 1, wherein a keep alive timer is implemented in the printer client and in the printer server, and the method further comprises the step of:

starting the keep alive timer at one of the printer server and the printer client each time a valid message is received from the other of the printer server and the printer client.

16. The method according to claim 15, further comprising the step of:

closing the connection between the printer client and the printer server when the keep alive timer expires.

17. The method according to claim 1, wherein the step of starting the print job comprises the printer client requesting that the printer server start the print job in a request message.

18. The method according to claim 17, wherein said request message is received and confirmed by the printer server and a confirmation is sent in a response message to the printer client.

19. The method according to claim 1, wherein the step of sending the print data from the processing unit to the printer comprises sending the print data in a number of print data request messages.

20. The method according to claim 19, further comprising the step of:

sending an acknowledgement message from the printer server to the printer client after the printer server has received a predetermined number of the print data request messages.

21. The method according to claim 1, further comprising the step of:

indicating that the printer is out of paper in a message sent from the printer server to the printer client.

22. The method according to claim 21, further comprising the step of:

indicating that the printer is refilled with paper in another message sent from the printer server to the printer client.

23. The method according to claim 22, further comprising the step of:

continuing the printing by continuing to send print data request messages to the printer server starting with the print data request message subsequent to a last received print data acknowledgement message.

24. The method according to claim 1, further comprising the step of:

stopping a keep alive timer when the ACL connection is disconnected during printing.

25. The method according to claim 24, further comprising the step of:

requesting a reconnection of a session defined by a session identifier in a message sent from the printer client to the printer server.

26. The method according to claim 25, further comprising the step of:

sending a response according to whether the reconnection is granted in a response message from the printer server to the printer client.

27. The method according to claim 26, further comprising the step of:
continuing the printing by continuing to send print data request messages after the printer client receives a granted reconnection response starting with the print data request message subsequent to a last received print data acknowledgement message.

28. The method according to claim 1, wherein the step of stopping the print job comprises sending a request to stop the print job in a message from the printer client to the printer server.

29. The method according to claim 28, further comprising the step of:
sending a response message comprising a confirmation from the printer server to the printer client after the printer server receives the request to stop the print job.

30. The method according to claim 1, wherein the step of closing the ACL connection between the processing unit and the printer comprises the printer client requesting a disconnection of a session defined by a session identity in a message sent to the printer server.

31. The method according to claim 30, wherein the printer server indicates whether the disconnection was granted in a response message sent from the printer server to the printer client.

32. The method according to claim 1, further comprising the step of:
stopping the sending of the keep alive messages after the ACL connection is closed.

33. The method of claim 1, wherein at least some of the keep alive messages inform one of the printer server and the printer client that the other of the printer server and the printer client is hard loaded and is operating more slowly than normal.

34. The method of claim 1, wherein each keep alive message only results in one of the printer server and the printer client restarting a keep alive timer.

35. A computer program product loadable into an internal memory of a digital computer within at least one of a processing unit and a printer in a communication system, the computer program product comprising software code portions for performing the steps of claim 1 when said product is executed.

36. A computer program product stored on a computer usable medium, the computer program product comprising readable program code for causing a computer within at least one of a processing unit and a printer in a communication system to control an execution of the steps of claim 1.

37. An entity in a processing unit, the entity comprising:
a Bluetooth protocol stack comprising a Logical Link Control and Adaptation Protocol (L2CAP) and a wireless printer protocol, the wireless printer protocol comprising a printer client capable of communicating with a printer server in a printer;
an establishing device arranged for establishing a bi-directional wireless asynchronous connection-less (ACL) connection to the printer by calling the L2CAP requesting the connection;
an establishing device arranged for establishing a connection for one or more print jobs between the printer client and the printer server;
a negotiating device arranged for negotiating configuration parameters with the printer server;
a sending device arranged for sending keep alive messages repeatedly to the printer server, wherein at least some of the keep alive messages are sent periodically after negotiation of the configuration parameters, wherein the connection between the printer client and the printer server is closed when at least one of: (i) the sending device fails to communicate one or more of the keep alive messages to the printer server, and (ii) the printer client fails to receive one or more keep alive messages from the printer server;
a starting device arranged for starting a print job;
a sending device arranged for sending print data to the printer server;
a stopping device arranged for stopping the print job; and
a closing device arranged for closing the ACL connection between the processing unit and the printer.

38. The entity according to claim 37, wherein the establishing device for establishing the connection for the one or more print jobs comprises a sending device arranged for sending a connection request message from the printer client to the printer server.

39. The entity according to claim 37, wherein the negotiating device uses default values when negotiating the configuration parameters and comprises a sending device arranged for sending a configuration request message to the printer server, the configuration request message including no new options.

40. The entity according to claim 37, wherein the negotiating device comprises a sending device arranged for sending a configuration request message to the printer server, the configuration request message including a suggestion of configuration options.

41. The entity according to claim 40, wherein the negotiating device further comprises a sending device arranged for sending a further configuration request message to the printer server, the further configuration request message including a further suggestion of configuration options which differs from the earlier suggestion.

42. The entity according to claim 37, wherein the entity further comprises a sending device arranged for sending a set attribute request message to the printer server after negotiating the configuration parameters, the set attribute request message comprising a coding table concerning a negotiated coding type.

43. The entity according to claim 37, wherein a keep alive timer is implemented in the printer client.

44. The entity according to claim 43, wherein the entity further comprises a starting device arranged for starting the keep alive timer each time a valid message is received from the printer.

45. The entity according to claim 44, wherein the entity further comprises a closing device arranged for closing the connection between the printer client and the printer server when the keep alive timer expires.

46. The entity according to claim 43, wherein the entity further comprises a stopping device arranged for stopping the keep alive timer when the ACL connection is disconnected during the printing.

47. The entity according to claim 37, wherein the starting device comprises a sending device arranged for sending a request message to the printer server, the request message comprising a request to start the print job.

48. The entity according to claim 37, wherein the sending device for sending the print data to the printer server comprises a sending device arranged for sending a number of print data request messages to the printer server, the print data request messages comprising the print data.

49. The entity according to claim 48, wherein the entity further comprises a continuing device arranged for continuing the printing when the printing is interrupted by a refill of paper at the printer, the printing continued by continuing to send the print data request messages to the printer server starting with the print data request message subsequent to a last received print data acknowledgement message.

50. The entity according to claim 37, wherein the entity further comprises a requesting device arranged for requesting a reconnection of a session defined by a session identifier in a message sent to the printer server after a break in the ACL connection.

51. The entity according to claim 50, wherein the entity further comprises a continuing device arranged for continuing the printing in response to a granted reconnection response message by continuing to send print data request messages to the printer server starting with the print data request message subsequent to a last received print data acknowledgement message.

52. The entity according to claim 37, wherein the stopping device comprises a sending device arranged for sending a message to the printer server, the message comprising a request to stop the print job.

53. The entity according to claim 37, wherein the closing device comprises a sending device arranged for sending a message to the printer server, the message comprising a request to disconnect a session identified by a session identity.

54. The entity according to claim 37, wherein the entity further comprises a stopping device arranged for stopping the sending of the keep alive messages after the closing of the connection between the printer client and the printer server.

55. A printer entity in a printer, the printer entity comprising:
   a Bluetooth protocol stack comprising a Logical Link Control and Adaptation Protocol (L2CAP) and a wireless printer protocol, the wireless printer protocol comprising a printer server which communicates with a printer client in a processing unit;
   a negotiating device arranged for negotiating configuration parameters with the printer client;
   a sending device arranged for sending keep alive messages repeatedly to the printer client, wherein at least some of the keep alive messages are sent periodically after negotiation of the configuration parameters, wherein the connection between the printer client and the printer server is closed when at least one of: (i) the sending device fails to communicate one or more of the keep alive messages to the printer client, and (ii) the printer server fails to receive one or more keep alive messages from the printer client;
   a starting device arranged for starting a print job;
   a receiving device arranged for receiving print data from the printer client; and
   a stopping device arranged for stopping the print job.

56. The printer entity according to claim 55, wherein the printer entity further comprises a responding device arranged for responding to a connection request in a response message sent to the printer client regardless of whether the connection is successful.

57. The printer entity according to claim 55, wherein the negotiating device comprises a responding device arranged for responding to a configuration request regardless of whether configuration options in the configuration request are supported by the printer server.

58. The printer entity according to claim 55, wherein the negotiating device comprises a loading device arranged for loading a coding table sent from the printer client.

59. The printer entity according claim 58, wherein the negotiating device further comprises a sending device arranged for sending a response to the printer client regardless of whether the loading was successful.

60. The printer entity according to claim 55, wherein a keep alive timer is implemented in the printer server.

61. The printer entity according to claim 60, wherein the printer entity further comprises a starting device arranged for starting the keep alive timer each time a valid message is received from the processing unit.

62. The printer entity according to claim 55, wherein the starting device comprises a continuing device arranged for confirming a start print job request message sent from the printer client.

63. The printer entity according to claim 55, wherein the receiving device comprises a sending device arranged for sending an acknowledgement message to the printer client after receiving a predetermined number of print data request messages.

64. The printer entity according to claim 55, wherein the printer entity further comprises an indicating device arranged for indicating, in a message sent to the printer client, that the printer is out of paper.

65. The printer entity according to claim 55, wherein the printer entity further comprises an indicating device arranged for indicating, in a message sent to the printer client, that the printer is refilled with paper.

66. The printer entity according to claim 55, wherein the printer entity further comprises a stopping device arranged for stopping a keep alive timer when an asynchronous connection-less (ACL) connection to the processing unit is disconnected during printing.

67. The printer entity according to claim 55, wherein the printer entity further comprises a sending device arranged for sending a response message to the printer client according to whether a reconnection request is granted.

68. The printer entity according to claim 55, wherein the stopping device comprises a sending device arranged for sending a response message comprising a confirmation after the printer server has received a request to stop the print job.

69. The printer entity according to claim 55, wherein the printer entity further comprises a sending device arranged for sending a response message to the printer client according to whether a disconnection request is granted.

70. The printer entity according to claim 55, wherein the printer entity further comprises a stopping device arranged for stopping the sending of the keep alive messages after the connection to the printer client is closed.

71. A communications system comprising:
   a processing unit according to claim 37; and
   a printer entity in a printer, the printer entity comprising:
      a Bluetooth protocol stack comprising a Logical Link Control and Adaptation Protocol (L2CAP) and a wireless printer protocol, the wireless printer protocol comprising a printer server which communicates with a printer client in the processing unit;
      a negotiating device arranged for negotiating configuration parameters with the printer client;
      a sending device arranged for sending keep alive messages repeatedly to the printer client, wherein at least some of the keep alive messages are sent periodically after negotiation of die configuration parameters, wherein the connection between the printer client and the printer server is closed when at least one of:

(i) the sending device fails to communicate one or more of the keep alive messages to the printer client, and (ii) the printer server fails to receive one or more keep alive messages from the printer client;

a starting device arranged for starting a print job;

a receiving device arranged for receiving print data from the printer client; and a stopping device arranged for stopping the print job.

* * * * *

UNITED STATES PATENT AND TRADEMARK OFFICE
CERTIFICATE OF CORRECTION

PATENT NO. : 7,324,226 B2
APPLICATION NO. : 09/867429
DATED : January 29, 2008
INVENTOR(S) : Orjan Fritz et al.

It is certified that error appears in the above-identified patent and that said Letters Patent is hereby corrected as shown below:

Page 2, under "Other Publications", insert -- Jaap Haartsen. "Bluetooth - The Universal Radio Interface for ad hoc, wireless connectivity," Ericsson Review No. 3, 1998 --

Under "Other Publications", delete "Version ☐☐ AO" and insert -- Version 1.0 --

Signed and Sealed this

Tenth Day of November, 2009

David J. Kappos
*Director of the United States Patent and Trademark Office*